(12) United States Patent
Trinkner et al.

(10) Patent No.: US 6,472,635 B2
(45) Date of Patent: *Oct. 29, 2002

(54) FUEL TANK FILLER ASSEMBLY FOR ENGINE DRIVEN WELDER

(75) Inventors: Michael J. Trinkner, Appleton, WI (US); Mark E. Peters, Menasha, WI (US); David E. Radtke, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 62 days.

This patent is subject to a terminal disclaimer.

(21) Appl. No.: 09/746,389

(22) Filed: Dec. 21, 2000

(65) Prior Publication Data

US 2001/0000607 A1 May 3, 2001

Related U.S. Application Data

(63) Continuation of application No. 09/356,822, filed on Jul. 19, 1999, now Pat. No. 6,172,332, which is a continuation of application No. 08/853,053, filed on May 8, 1997, now Pat. No. 5,928,535.

(51) Int. Cl.$^7$ .................................................. B23K 9/10
(52) U.S. Cl. ....................................... 219/133; 290/1 A
(58) Field of Search .......................... 219/133; 290/1 A, 290/1 R; 220/86.1, 86.2; 322/1; 123/3

(56) References Cited

U.S. PATENT DOCUMENTS 5,928,535 A * 7/1999 Trinkner et al. ............ 219/133
6,172,332 B1 * 1/2001 Trinkner et al. ............ 219/133

OTHER PUBLICATIONS

Ranger 9 Operator's Manual IM511 Jun. 1993, p. 28.
Ranger 9 Operator's Manual IM511–A May 1995, p. 230–E.4.
Instruction Manual for Thermadyne Company Model TA–10/270–H AC/DC CC/CV Welding Generator.

* cited by examiner

*Primary Examiner*—Clifford C. Shaw
(74) *Attorney, Agent, or Firm*—Mark W. Croll; John H. Pilarski (57) ABSTRACT

An engine driven welder has a fuel tank with a filler tube that extends upwardly from a reservoir in the machine base. The filler tube upper end and a cap thereon are below the machine top cover. The machine top cover has a cutout into which is installed a grommet that closes the cutout and that fully protects the filler tube upper end and the cap. The grommet has a hole that seals over a top portion of the filler tube such that any spilled fuel does not leak inside the machine. The filler tube has an expansion space that prevents splashback and spillover during fueling. An angled tail pipe directs engine exhaust away from the welding machine in any desired direction.

43 Claims, 2 Drawing Sheets

FUEL TANK FILLER ASSEMBLY FOR ENGINE DRIVEN WELDER

This application is a continuation of U.S. patent application Ser. No. 09/356,822 filed Jul. 19, 1999, now U.S. Pat. No. 6,172,332, which is a continuation of U.S. patent application Ser. No. 08/853,053 filed May 8, 1997, now U.S. Pat. No. 5,928,535.

BACKGROUND OF THE INVENTION

This invention pertains to engine driven welding machines, and more particularly to tanks that hold fuel for welding machine engines.

DESCRIPTION OF THE PRIOR ART

A vital part of every engine driven welding machine is the tank that holds the fuel for the engine. In prior engine driven welding machines, the fuel tank was located entirely within the base of the machine. A filler hole was provided in a top wall of the tank. A suitable cap removably closed the filler hole. By removing the cap, a fuel nozzle could be inserted into the tank through the filler hole.

Although the prior fuel tanks served their intended purpose, they possessed certain disadvantages. For example, the top wall of the tank, and thus the filler hole, was at a low height on the welding machine, often only several inches above the floor. Consequently, a person filling the fuel tank was required to bend over to insert the fuel nozzle into the filler hole. A related drawback was that there was very little warning given to the person that the tank was approaching a full condition. As soon as the tank was filled up to the top wall, which was difficult to observe, any additional fuel would spill out the filler hole. The spilled fuel would run down the sides of the fuel tank and into the welding machine base, where it was impractical to wipe up. Fill gauges were often incorporated into the fuel tanks, but they were not sufficiently sensitive to indicate a full tank condition quickly enough to prevent spillover. Also, the filler hole was on one side of the welding machine, so that side of the machine could not be placed against a wall.

In some applications, fuel tanks have been rendered more convenient to fill by making them with long filler tubes and by locating the filler tube opening so as to be easily accessible. A long filler tube has the additional advantage of providing a storage space for excess fuel that is delivered after the tank is full but before the fuel delivery pump is stopped, provided there were no leaks in the filler tube or in the junction between the filler tube and the tank. However, a long filler tube presents the potential problem of a buildup of air pressure within the tank during rapid filling. If the filling is suddenly stopped, the air pressure can force any fuel in the filler tube back up and out its openings, thereby spilling fuel and possibly even spraying it on the person filling the tank. The reduced diameter of the filler tube also created a high velocity of fuel moving up the tube during filling that could easily spill if not shut off in time.

It is known to provide engine driven welding machines with fuel tanks having long filler tubes. However, the tops of the prior filler tubes and their caps were exposed above the top of the welding machine cover.

U.S. Pat. Nos. 4,759,458 and 5,320,147 and German patent 23 53 448 show filler tubes that have enlargements near their respective openings. The enlargements serve as chambers for temporarily storing fuel that is forced back out the filler tubes by air pressure inside the fuel tank. The arrangement of U.S. Pat. No. 4,759,458 also includes lines that vent air in the tank to the filler tube chamber.

Although the designs of some prior fuel tanks possess certain desirable characteristics, there nevertheless is room for further advancements in fuel tank design.

SUMMARY OF THE INVENTION

In accordance with the present invention, a fuel tank filler assembly for engine driven welders is provided that combines anti-splashback with protective and aesthetic features. This is accomplished by apparatus that includes a grommet that fits in a welding machine cover and over a fuel tank filler tube a short distance above an expansion space in the filler tube.

The grommet has a bent side wall, which may be U-shaped, with top, bottom, and front edges. The space between the side wall is closed along its bottom edge with a bottom wall. The side wall front and top edges are turned outwardly to form flanges. The edge of the bottom wall not surrounded by the side wall has a downturned flange. The grommet bottom wall has a hole through it that is defined by a flexible lip.

The fuel tank filler tube has a lower end that opens into a reservoir, with the filler tube and the reservoir being made of one piece of polymeric material. The reservoir fits neatly within the welding machine base. An upper end of the filler tube is approximately at waist height to a person. The filler tube has a variable cross section and is configured to clear various components inside the welding machine. The top cover on the welding machine is cut out over the filler tube upper end.

The grommet is attached to the welding machine top cover so as to fit within the cutout therein. When the grommet is in place, its flanges overlie the welding machine top cover, but its bottom wall is located below the machine top cover. The hole in the grommet bottom wall fits over a circular top portion of the fuel tank filler tube. The outer diameter of the filler tube top portion is slightly larger than the inner diameter of the lip of the grommet hole. Consequently, the grommet lip bends slightly as the grommet is fit over the filler tube, thereby creating a tight seal between the filler tube and the grommet. The filler tube upper end and its cap are below the machine top cover.

The filler tube expansion space is below the grommet bottom wall. The expansion space protrudes from one side of the filler tube. The cross sectional area of the expansion space is greater than the area of the filler tube immediately below the expansion space. Accordingly, any potential splashback of the fuel up and out the filler tube during fuel delivery is prevented, because the fuel can temporarily accumulate in the expansion space. Similarly, the decreased velocity of the fuel rising in the filler tube when it reaches the expansion space gives the automatic fuel shut off valve sufficient time to react and stop the fuel flow, thus preventing spillover.

Further in accordance with the present invention, the combined functional and aesthetic features of the welding machine include its exhaust system. The exhaust system is designed such that the engine muffler is a short distance below the welding machine top cover. A muffler exhaust tube rises vertically out of the muffler. There is a hole through the top cover aligned with the muffler exhaust tube. A bent tail pipe is clamped to the muffler exhaust tube and protrudes through the hole in the top cover. By loosening the clamp, the tail pipe can be rotated 360 degrees about the muffler exhaust tube and then reclamped at any desired angular position. In that manner, a person can direct the exhaust gases from the engine in any desired direction.

The method and apparatus of the invention, using an expansion space on a filler tube that is protected at its upper end, thus enables a welding machine fuel tank to be filled with convenience and safety. Any fuel that does spill out of the filler tube is prevented by the grommet from running inside the machine.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
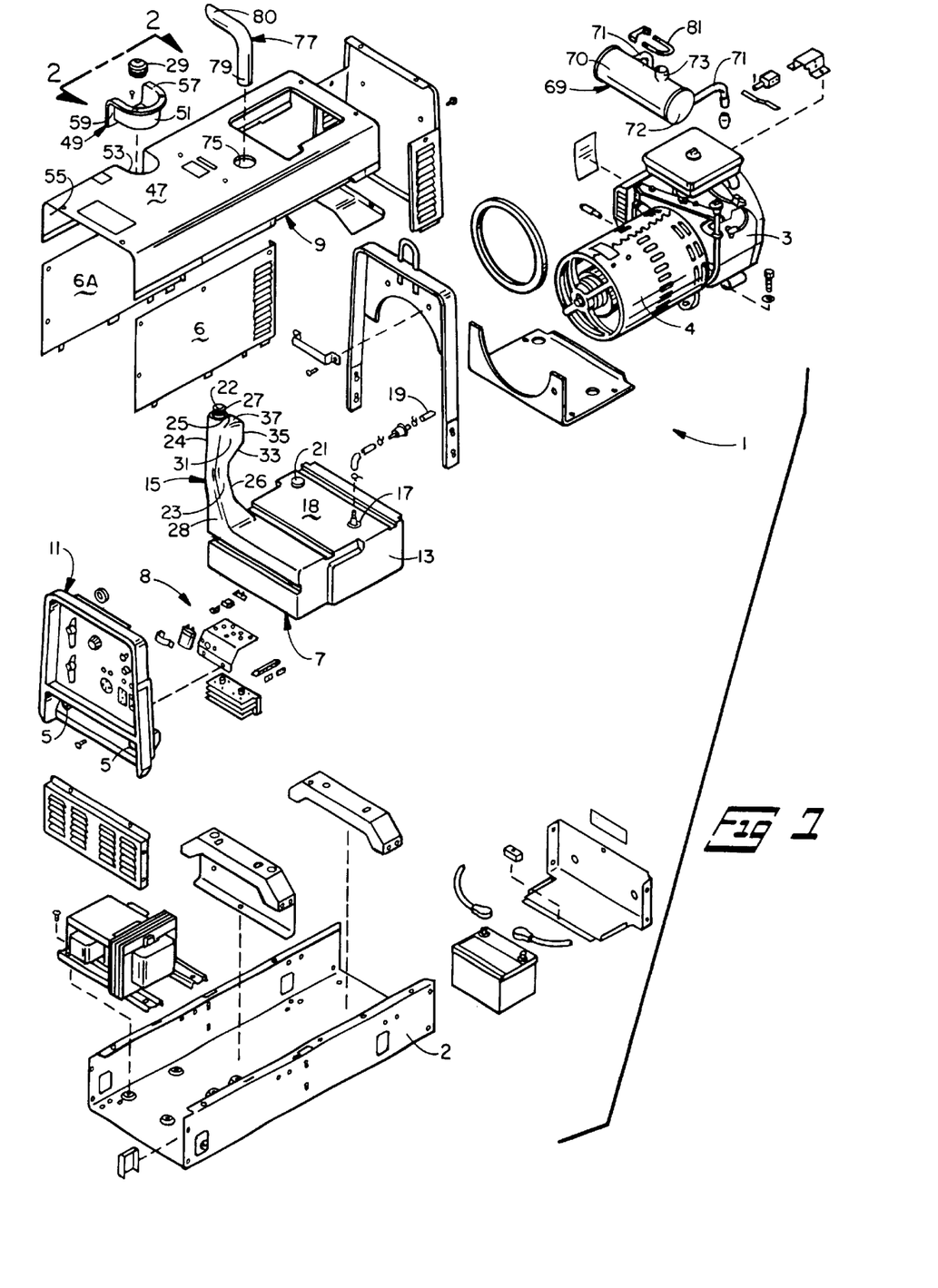
FIG. 1 is an exploded perspective view of a typical engine driven welding machine that includes the present invention.
Figure 2:
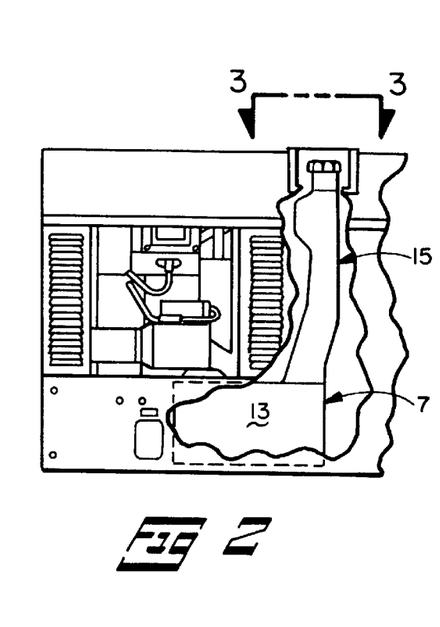
FIG. 2 is a broken partial view of the assembled welding machine of FIG. 1, taken generally along line 2—2 of FIG. 1.
Figure 3:
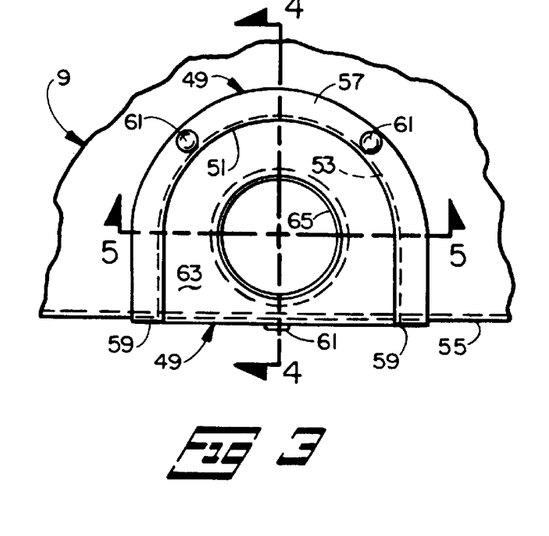
FIG. 3 is a view on an enlarged scale taken along line 3—3 of FIG. 2.

Referring first to FIG. 1, an engine driven welding machine 1 is illustrated that includes the present invention. The welding machine 1 comprises a base 2 that supports an electric generator 4. The generator 4 is driven by an internal combustion engine 3. Electrical power from the generator is conditioned by known components, typically represented at reference numeral 8, to be suitable for welding use and available at terminals 5. Side covers 6 and 6A cover most of the sides of the welding machine. A top cover 9 and an end cover assembly 11 fit neatly with the side covers 6 and 6A to substantially enclose the working components of the welding machine.

In accordance with the present invention, fuel for the internal combustion engine 3 is stored in a novel fuel tank 7. The fuel tank 7 is comprised of a generally rectangular reservoir 13 and a filler tube 15. The reservoir 13 has six sides that are sized and shaped to fit within the welding machine base 2. There is a suitable opening 17 in the reservoir top side 18 to enable fuel to be pumped out through line 19 to the engine. Another opening 21 in the reservoir top side 18 accommodates a gauge.

The filler tube 15 of the fuel tank 7 extends upwardly from one corner of the reservoir top side 18. The filler tube 15 and the reservoir 13 are rotomolded of a polymeric material, preferably cross-linked H.D. polyethylene, so they are of one piece and won't leak at their junction. The filler tube terminates in an upper end 22 that is located below the top panel 47 of the welding machine top cover 9. The cross section of the filler tube is preferably rectangular for its full height so as to have an inside wall 23, an outside wall 24, a front wall 26, and a back wall 28. The shape and size of the filler tube cross section varies along its length. Particularly, the inside wall 23 is contoured in a concave shape so as to clear the generator 4. The upper end 22 of the filler tube is formed with external threads 27. A vent-type cap 29 is removably threadable onto the threads 27. Immediately below the threads is a circular top portion 25.

Next to the top portion 25 of the filler tube 15 is an expansion space 31. In the illustrated construction, the expansion space 31 is defined by a projection of the filler tube front wall 26. The expansion space 31 is in the form of a bottom angled wall 33, a short vertical wall 35, and a top angled wall 37. Also see FIGS. 2–5. The upper end 39 of the top angled wall 37 blends into the filler tube circular portion 25.

Figure 5:
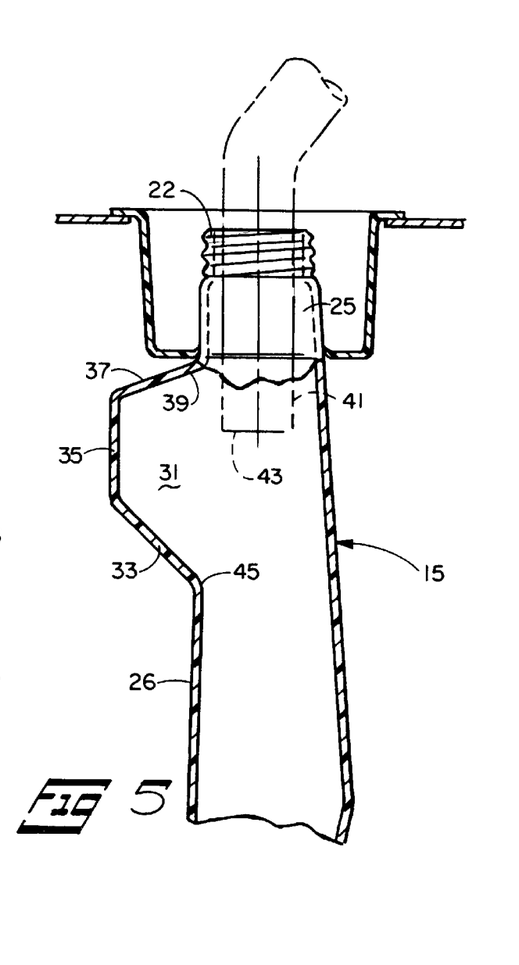
FIG. 5 is a partial cross sectional view taken along line 5—5 of FIG. 3.

In FIG. 5, the filler tube cap 29 is shown removed from the filler tube 15, and a conventional fuel nozzle 41 is shown inserted into the filler tube upper end 22. It is highly desirable that the maximum insertion of the nozzle 41 be limited such that the nozzle end 43 is at a higher level within the filler tube than the junction 45 of the expansion space bottom angled wall 33 with the front wall 26.

The expansion space 31 serves to prevent spillover when filling the fuel tank 7 with the nozzle 41. The rapid rise of the fuel up the filler tube 15 after the reservoir 13 is full but before the nozzle is turned off is ameliorated by the expansion space. The increased area of the expansion space compared with the rest of the filler tube enables the velocity of the rising fuel to slow at the expansion space. Consequently, the automatic fuel shut off valve has a chance to turn off the fuel pump before the fuel spills out of the filler tube upper end 22. Similarly, the expansion space prevents fuel splashback due to confined air pressure within the reservoir when the nozzle is suddenly shut off after a time of rapid filling.

Further in accordance with the present invention, the convenience and aesthetics associated with the fuel tank 7 are greatly improved over prior fuel tanks. The circular top portion 25 of the filler tube 15, although below the top panel 47 of the welding machine top cover 9, is nevertheless easily accessible. As a result, the fuel tank can be filled without requiring a person to bend over to the base 2. To provide protection to the filler tube and cap, and to allow for reduced volume in shipping and storing stacked welding machines, while providing easy access to the filler tube, as well as to give a neat appearance to the welding machine 1, a grommet 49 is incorporated into the welding machine top cover. In the preferred embodiment, the grommet 49 has a U-shaped vertical wall 51 that fits into a complimentary cutout 53 in the top cover. The cutout 53 is centered on the fuel tank filler tube. The side panel 55 of the machine top cover is also cut out for a distance equal to the height of the grommet curved wall 51. A top flange 57 extends outwardly from a top edge of the grommet curved wall. Front flanges 59 extend outwardly from the front edges of the curved wall.

Figure 4:
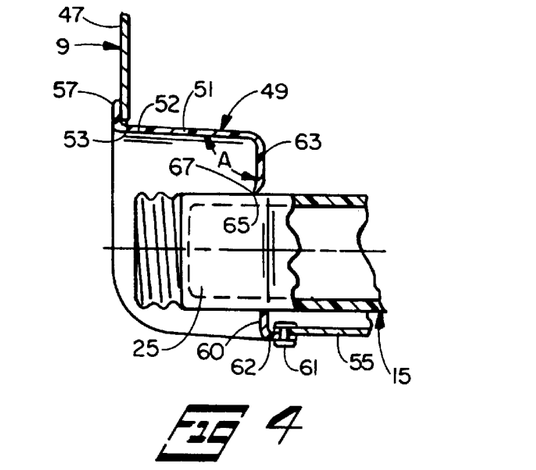
FIG. 4 is a partial cross sectional view taken along line 4—4 of FIG. 3.

The grommet 49 also has a bottom wall 63 that joins to the curved wall bottom edge and that fills the area inside the curved wall 51. As best shown in FIG. 4, the bottom wall 63 makes an obtuse angle A with the apex 52 of the curved wall. A satisfactory angle A is approximately 94 degrees. The free end 60 of the bottom wall terminates in a downturned flange 62. The grommet bottom wall has a hole 65 therethrough. The hole 65 is defined by a flexible lip 67. The inner diameter of the lip 67 is slightly less than the outer diameter of the circular portion 25 of the fuel tank filler tube 15.

When installed in the cutout 53 in the welding machine top cover 9, the grommet 49 completely closes the cutout. The top flange 57 overlies the top cover top panel 47, and the front flanges 59 and 62 overlie the side panel 55. Three rivets 61 attach the grommet to the top cover.

To install the grommet 49 in the welding machine top cover 9, the grommet hole 65 passes over the fuel tank filler tube top portion 25. The lip 67 bends against the filler tube 15, as best shown in FIGS. 4 and 5, and thereby forms a fuel proof seal with the filler tube. Consequently, any fuel that might spill from the nozzle 41 during the fueling process will not leak inside the welding machine 1. Rather, the fuel will merely flow down the grommet angled bottom wall 63 and down the outside of the welding machine top cover 9 and side cover 6A, from which it can be easily cleaned. The grommet bottom wall is sufficiently below the top cover top panel 47 that the filler tube upper end 22 and the cap 29 are also below the top cover top panel. The filler tube upper end and the cap are surrounded on three sides and are thus fully protected by the grommet vertical wall 51.

The aesthetics of the welding machine 1, both from an appearance standpoint and from a functional standpoint, is further enhanced by the design of the exhaust system of the internal combustion engine 3. Returning to FIG. 1, an engine muffler 69 having a cylindrical portion 70 and opposed ends 72 is horizontally oriented and is located above the engine and directly under the welding machine top cover 9. There are two exhaust inlets 71 from the engine to the muffler 69. There is a single exhaust outlet tube 73 from the muffler cylindrical portion 70. The exhaust tube 73 is vertical and is aligned with a hole 75 in the top cover 9.

A tail pipe 77 has a lower end 79 that protrudes through the top cover hole 75 and fits loosely over the muffler exhaust tube 73. The tail pipe upper end 80 is bent at approximately 90 degrees to the lower end 79. The tail pipe can be rotated through 360 degrees about the muffler exhaust tube. A clamp 81 is used to clamp the tail pipe lower end to the muffler exhaust tube at any desired angular orientation. In that manner, the welding machine operator can direct the exhaust from the engine 3 in any desired direction.

Thus, it is apparent that there has been provided, in accordance with the invention, a fuel tank filler assembly for engine driven welders that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An engine driven welder comprising:
   a. a base having first and second generally vertical side walls line in respective first and second vertical side planes, the base defining a horizontal longitudinal axis that is generally parallel to the first and second side planes and a horizontal transverse axis generally perpendicular to the first and second side planes;
   b. an electric generator supported on the base;
   c. means for driving the generator to produce electric power;
   d. a top cover having a first side panel upstanding from the base first side wall, and a second side panel upstanding from the base side wall, and a top panel joining the first and second side panels along respective corners; and
   e. a fuel tank comprising a reservoir located in the base, and a generally vertical filler tube having a lower end opening into the reservoir and an upper end proximate the top cover, the filler tube having a top portion adjacent the top cover, an expansion space connected to the top portion, and a third portion between the expansion space and the reservoir, the filler tube lower end defining a first generally vertical longitudinal centerline, and the filler tube upper end top portion defining a second generally vertical longitudinal centerline that is eccentric to the first longitudinal centerline.

2. The engine driven welder of claim 1 wherein the second vertical longitudinal centerline is displaced in a direction perpendicular to the first and second vertical side planes from the first vertical longitudinal centerline.

3. An engine driven welder comprising:
   a. a base having first and second generally vertical side walls line in respective first and second vertical side planes, the base defining a horizontal longitudinal axis that is generally parallel to the first and second side planes and a horizontal transverse axis generally perpendicular to the first and second side planes;
   b. an electric generator supported on the base;
   c. means for driving the generator to produce electric power;
   d. a top cover having a first side panel upstanding from the base first side wall, and a second side panel upstanding from the base side wall, and a top panel joining the first and second side panels along respective corners; and
   e. a fuel tank comprising:
      i. a reservoir located in the base and having a generally horizontal top wall with a non-circular opening therein of a predetermined size and shape that defines a first area centroid; and
      ii. a generally vertical filler tube having lower and upper ends, the filler tube lower end having a non-circular opening of the predetermined size and shape that defines a second area centroid that is coincident with the first area centroid, the filler tube upper end having a top portion proximate the welder top cover and defining and being symmetrical about a vertical centerline and having an opening that receives fuel, the filler tube having an expansion space connected to the top portion, and a third portion between the expansion space and the reservoir, wherein the first and second area centroids do not lie on the vertical centerline.

4. The engine driven welder of claim 3 wherein the filler tube vertical centerline is displaced relative to the first and second area centroids in a direction parallel to the first and second side planes.

5. In combination:
   a. an engine driven welder comprising:
      i. a base;
      ii. means supported on the base for producing welding power; and
      iii. a fuel tank having a reservoir in the base, and a filler tube having a lower end that opens into the reservoir and an upper end, the filler tube having a top portion adjacent the upper end that defines a first predetermined cross-sectional area, an expansion space connected to the top portion and having a second predetermined cross-sectional area that is larger than the first predetermined cross-sectional area, and an intermediate portion connected to the expansion space at a junction therebetween and having a third predetermined cross-sectional area that is less than the second predetermined cross-sectional area; and
   b. a fuel nozzle removeably insertable into the filler tube upper end for directing fuel into the filler tube, the nozzle having a free end that is limited to being inserted into the filler tube upper end such that the nozzle free end is between the junction of the expansion space with the filler tube third portion and the filler tube upper end.

6. An engine driven welder comprising:
   a. a base having first and second generally vertical side walls lying in respective first and second vertical side planes;
   b. means supported on the base for producing welding power;
   c. a top cover connected to the base side walls and generally overlying the means for producing welding power; and
   d. a fuel tank comprising a reservoir in the base and having a top wall, and a filler tube having a lower end that opens into the reservoir top wall and an upper end adjacent the top cover, the filler tube having variable cross-sectional shapes at respective locations between the lower and upper ends, the filler tube having a top portion adjacent the upper end that defines a vertical centerline and that further defines a vertical transverse plane through the vertical centerline that is perpendicular to the first and second side planes, the filler tube comprising a top portion adjacent the top cover, a non-circular expansion space connected to the top portion, and a non-circular third portion between the expansion space and the reservoir, at least some of the locations between the filler tube lower and upper ends having respective cross-sectional shapes that are asymmetrical about the vertical transverse plane.

7. The engine driven welder of claim 6 wherein at least some of the locations between the filler tube lower and upper ends have respective cross-sectional shapes that are elongated in directions parallel to the first and second side planes.

8. An engine-driven welder comprising:
   a. a base having first and second generally vertical side walls lying in respective first and second vertical side planes, the base defining a central plane midway between and parallel to the base first and second side lanes;
   b. an electric generator supported on the base;
   c. an engine that drives the generator to produce electric power, the engine including a muffler having a muffler longitudinal axis that is perpendicular to the base central plane, the muffler having a vertically extending exhaust tube located between the first base side plane and the central plane;
   d. a fuel tank comprising a reservoir located in the base, and a filler tube having a lower end opening into the reservoir and an upper end;
   e. a top cover having a first side panel upstanding from the base first side wall, a second side panel upstanding from the base second side wall, and a top panel lying in a generally horizontal top plane and joining the first and second side panels along respective first and second corners, the top cover defining a cutout through the top and second side panels and the second corner that is proximate the upper end of the fuel tank filler tube;
   f. a grommet installed in and closing the top cover cutout, the grommet having a bottom wall with an opening therethrough that fits snugly over the fuel tank filler tube; and
   g. a cap removeably threadable onto the filler tube upper end.

9. The engine-driven welder of claim 8 wherein the engine has two exhaust outlets, one on either side of the central plane, and wherein the exhaust outlets enter the muffler on either side of the central plane.

10. The engine-driven welder of claim 8 further comprising a tail pipe on the muffler exhaust tube that is selectively rotatable 360 degrees about the exhaust tube to direct exhaust from the welder in any desired direction.

11. The engine-driven welder of claim 8 wherein the filler tube upper end is between the top cover top plane and the base.

12. The engine-driven welder of claim 8 wherein the cap defines an annular bottom edge that is generally parallel to the top cover top plane when the cap is threaded onto the filler tube upper end, and wherein the cap annular bottom edge is between the top cover top plane and the base when the cap is threaded onto the filler tube.

13. An engine-driven welder comprising:
   a. a base having first and second generally vertical side walls;
   b. an electric generator supported on the base;
   c. an engine that drives the generator to produce electric power;
   d. a fuel tank having a reservoir in the base, and a filler tube upstanding from the reservoir and being of one piece therewith and having an upper end, the filler tube defining an expansion space between the upper end and the reservoir to provide an increased cross-sectional area in the filler tube;
   e. a top cover having a first side panel upstanding from the base first side wall, a second side panel upstanding from the base second side wall, and a top panel joining the first and second side panels along respective first and second corners, the top cover defining a cutout through the top and second side panels and the second corner that is proximate the upper end of the fuel tank filler tube; and
   f. a grommet installed in and closing the top cover cutout, and fitting snugly over the fuel tank filler tube.

14. The engine-driven welder of claim 13 wherein the filler tube upper end is between the top cover top plane and the base.

15. The engine-driven welder of claim 13 further comprising a cap removeably threadable onto the filler tube upper end, the cap having an annular bottom edge that is generally parallel to the top cover top plane when the cap is threaded onto the filler tube, wherein the cap annular bottom edge is between the top cover top plane and the base when the cap is threaded onto the filler tube.

16. The engine-driven welder of claim 13 wherein:
   a. the top cover cutout defines a continuous closed edge in the top cover top panel, second corner, and second side panel;
   b. the cutout closed edge has a bottom portion in the top cover second side panel that lies in a generally horizontal bottom plane parallel to the top cover top plane; and
   c. the filler tube upper end is between the top cover top plane and the cutout bottom portion bottom plane.

17. The engine-driven welder of claim 13 wherein the grommet comprises:
   a. a generally vertical wall with top and front edges;
   b. a bottom wall joined to the vertical wall and having a free edge that is generally coplanar with the vertical wall front edges, the bottom wall having an opening therethrough that fits snugly over the fuel tank filler tube; and c. an outturned flange having a first section along the vertical wall top edge that lies in flat facing contact with the top panel of the top cover, the outturned flange having second sections along the respective vertical side wall front edges that lie in flat facing contact with the second side panel of the top cover.

18. The engine-driven welder of claim 13 wherein:
   a. the top cover cutout defines a continuous closed edge in the top panel, second corner, and second side panel; and
   b. the cutout edge in the top panel is partially defined by two generally parallel straight edges that extend from the second corner toward the first corner, and by a semi-circular edge that joins the straight edges.

19. A filler assembly in an engine-driven welding machine having a base, a generator, and a top cover having a top panel with a horizontal surface that defines a cutout therethrough, the filler assembly comprising:
   a. a fuel tank having a reservoir located within the welding machine base, and a filler tube upstanding from the reservoir, the filler tube having an upper end adjacent the top cover, a top portion with a first predetermined cross sectional area adjacent the filler tube upper end, an expansion space with a second predetermined cross sectional area connected to the top portion, and a lower portion connecting the expansion space to the reservoir, the lower portion having a third predetermined cross sectional area at a selected distance between the expansion space and the reservoir, the second predetermined cross sectional area being larger than the first and third predetermined cross sectional areas;
   b. a cap removeably received on the fuel tank filler tube upper end, the cap having an annular bottom surface that is below the top cover horizontal surface with the cutout therethrough when the cap is received on the filler tube upper end; and
   c. a grommet attached to the welding machine top cover comprising a bottom wall having an opening therethrough sized and located to fit snugly over the fuel tank filler tube,
   so that the velocity of fuel rising in the fuel tank filler tube decreases at the expansion space to reduce fuel splashback and spillover during fueling, and any fuel spilled during fueling does not run down the inside of the welding machine top cover.

20. The filler assembly of claim 19 wherein the grommet further comprises a flexible lip in the bottom wall that bends and seals against the fuel tank filler tube.

21. The filler assembly of claim 19 wherein the grommet bottom wall is substantially flat and is below the welding machine top cover.

22. The filler assembly of claim 19 wherein the filler tube upper end is between the top panel horizontal surface that defines the cutout therein and the base.

23. In combination with an engine-driven welding machine having a base, and means on the base for producing welding power:
   a. a top cover having at least two side panels upstanding from the base and a top panel between said at least two side panels, the top panel having a surface that defines a generally horizontal top plane and that has a cutout therethrough;
   b. a fuel tank with a reservoir that is located within the welding machine base, and a filler tube upstanding from the reservoir, the filler tube having an upper end that is between the base and the top plane defined by the top cover surface with the cutout therethrough;
   c. a grommet installed in the top cover cutout and fitting over the fuel tank filler tube; and
   d. a cap removeably received over the filler tube upper end.

24. The combination of claim 23, wherein the top cover cutout is in a selected one of said at least two top cover side panels and in the top cover top panel.

25. The combination of claim 23, wherein the cap is removeably threadable onto the filler tube upper end, and wherein the cap has an annular bottom surface that is between the base and the top plane defined by the top cover surface with the cutout therethrough when the cap is threaded onto the filler tube upper end.

26. An engine-driven welder comprising:
   a. a base having first and second generally vertical side walls lying in respective first and second vertical side planes, the base defining a central plane midway between and parallel to the base first and second side planes;
   b. an electric generator supported on the base;
   c. an engine that drives the generator to produce electric power, the engine including a muffler having a muffler longitudinal axis that is perpendicular to the base central plane, the muffler having a vertically extending exhaust tube located between the first base side plane and the central plane; and
   d. a fuel tank assembly comprising a reservoir located in the base, and a filler tube having a lower end opening into the reservoir and an upper end, the filler tube upper end being located between the base central plane and the second side plane.

27. The engine-driven welder of claim 26 wherein the engine has two exhaust outlets, one on either side of the central plane, and wherein the exhaust outlets enter the muffler on either side of the central plane.

28. The engine-driven welder of claim 26 further comprising a tail pipe on the muffler exhaust tube that is rotatable 360 degrees about the exhaust tube.

29. A filler assembly in an engine-driven welding machine having a base, a generator, and a top cover, the filler assembly comprising:
   a. a fuel tank having a reservoir that is located within the welding machine base, and a filler tube upstanding from the reservoir, the filler tube having a top portion with a first predetermined cross-sectional area adjacent the welding machine top cover, an expansion space with a second predetermined cross-sectional area connected to the top portion, and a lower portion connecting the expansion space to the reservoir, the lower portion having a third predetermined cross-sectional area at a selected distance between the expansion space and the reservoir, the second predetermined cross-sectional area being larger than the first and third predetermined cross-sectional areas;
   b. a cap removeably received on the fuel tank filler tube upper end, at least a portion of the cap being below the top cover when the cap is received on the filler tube upper end; and
   c. a grommet attached to the welding machine top cover comprising a generally U-shaped vertical wall having opposed sides and being at least partially below the welding machine top cover, and a bottom wall joined to and extending between the opposed sides of the curved wall, the bottom wall having an opening therethrough sized and located to fit snugly over the fuel tank filler tube, so that the velocity of fuel rising in the fuel tank filler tube decreases at the expansion space to reduce fuel splashback and spillover during fueling, and any fuel spilled during fueling does not run down the inside of the welding machine top cover.

30. The filler assembly of claim 29 wherein the grommet further comprises a flexible lip in the bottom wall that bends and seals against the fuel tank filler tube.

31. The filler assembly of claim 29 wherein the grommet bottom wall is substantially flat and is below the welding machine top cover.

32. An engine-driven welder comprsing:
(a) an engine;
(b) a generator connected to the engine and which produces electric power upon operating of the engine;
(c) a fuel tank in fluid communication with the engine;
(d) a filler tube having an inlet end for refueling and an outlet end which is in fluid communication with the fuel tank, the filler tube defining an expansion space between the inlet end and the outlet end, the expansion space being a region of increased cross-sectional area relative to the cross-sectional area of the filler tube at the inlet end and the cross-sectional area of the outlet end, the expansion space accommodating variances in fuel flow to thereby assist in avoiding fuel spillover at the inlet end during fueling.

33. An engine-driven welder comprising:
(a) an engine;
(b) a generator connected to the engine and which produces electric power upon operating of the engine;
(c) a fuel tank in fluid communication with the engine;
(d) a filler tube having an inlet end for refueling and an outlet end which is in fluid communication with the fuel tank;
(e) a cover which has a top surface and a side surface which meet, the cover having a recessed portion which forms a surface offset relative to the top surface from which extends a length of the filler tube terminating in the inlet end of the filler tube.

34. The engine-driven welder of claim 33 wherein the surface offset relative to the top surface of the cover is a first surface and the recessed portion forms a second surface offset relative to the side surface of the cover.

35. The engine-driven welder of claim 33 wherein the surface offset relative to the top surface is defined by a grommet which is nested within the recessed portion.

36. The engine-driven welder of claim 35 wherein the grommet has a bottom wall with an opening therethrough that fits snugly over the fuel tank filler tube.

37. The engine-driven welder of claim 33 further including a cap which is removeable from the inlet end of the filler tube.

38. An engine-driven welder comprising;
(a) a base having a lengthwise dimension and a widthwise dimension;
(b) an engine supported by the base;
(c) a generator connected to the engine and which produces electric power upon operating of the engine;
(d) a muffler that is in fluid communication with the engine to receive exhaust therefrom and which is oriented tansverse to the lengthwise dimension of the base; and
(e) a tailpipe which is in fluid communication with the muffler to receive exhaust from the muffler and which extends upward from the muffler along a substantially vertical axis, the tailpipe having an outlet port angled relative to the vertical axis and rotatable along the substantially vertical axis to direct exhaust in one of a plurality of selected directions.

39. The engine-driven welder of claim 37, wherein the tailpipe is rotatable up to 360 degrees about.

40. An engine-driven welder comprising:
(a) an engine;
(b) a generator connected to the engine and which produces electric power upon operating of the engine;
(c) a fuel tank in fluid communication with the engine;
(d) a filler tube having an inlet end for refueling and an outlet end which is in fluid communication with the fuel tank, the filler tube defining an expansion space between the inlet end and the outlet end, the expansion space being a region of increased cross-sectional area relative to the cross-sectional area of the filler tube at the inlet end and the cross-sectional area of the outlet end, the expansion space accommodating variances in fuel flow to thereby assist in avoiding fuel spillover at the inlet end during fueling; and
(e) a cover which has a top surface and a side surface which meet, the cover having a recessed portion which forms a surface offset relative to the top surface from which extends a length of the filler tube terminating in the inlet end of the filler tube.

41. An engine-driven welder comprising:
(a) a base having a lengthwise dimension and a widthwise dimension;
(b) an engine supported by the base;
(c) a generator connected to the engine and which produces electric power upon opening of the engine;
(d) a fuel tank in fluid communication with the engine;
(e) a filler tube having an inlet end for refueling and an outlet end which is in fluid communication with the fuel tank, the filler tube defining an expansion space between the inlet end and the outlet end, the expansion space being a region of increased cross-sectional area relative to the cross-sectional area of the filler tube at the inlet end and the cross-sectional area of the outlet end, the expansion space accommodating variances in fuel flow to thereby assist in avoiding fuel spillover at the inlet end during fueling;
(f) a muffler that is in fluid communication with the engine to receive exhaust therefrom and which is oriented transverse to the lengthwise dimension of the base; and
(g) a tailpipe which is in fluid communication with the muffler to receive exhaust from the muffler and which extends upward from the muffler along a substantially vertical axis, the tailpipe having an outlet port angled relative to the vertical axis and rotatable along the substantially vertical axis to direct exhaust in one of a plurality of selected directions.

42. An engine-driven welder comprising:
(a) a base having a lengthwise dimension and a widthwise dimension;
(b) an engine supported by the base;
(c) a generator connected to the engine and which produces electric power upon operating of the engine;
(d) a fuel tank in fluid communication with the engine;
(e) a filler tube having an inlet end for refueling and an outlet end which is in fluid communication with the fuel tank;
(f) a cover which has a top surface and a side surface which meet, the cover having a recessed portion which forms a surface offset relative to the top surface from which extends a length of the filler tube terminating in the inlet end of the filler tube;

(g) a muffler that is in fluid communication with the engine to receive exhaust therefrom and which is oriented transverse to the lengthwise dimension of the base; and (h) a tailpipe which is in fluid communication with the muffler to receive exhaust from the muffler and which extends upward from the muffler along a substantially vertical axis, the tailpipe having an outlet port angled relative to the vertical axis and rotatable along the substantially vertical axis to direct exhaust in one of a plurality of selected directions.

43. An engine-driven welder comprsing:

(a) a base having a lengthwise dimension and a widthwise dimension;

(b) an engine supported by the base;

(c) a generator connected to the engine and which produces electric power upon operating of the engine;

(d) a fuel tank in fluid communication with the engine;

(e) a filler tube having an inlet end for refueling and an outlet end which is in fluid communication with the fuel tank, the filler tube defining an expansion space between the inlet end and the outlet end, the expansion space being a region of increased cross-sectional area relative to the cross-sectional area of the filler tube at the inlet end and the cross-sectional area of the outlet end, the expansion space accommodating vices in fuel flow to thereby assist in avoiding fuel spillover at the inlet end during fueling;

(f) a cover which has a top surface and a side surface which meet, the cover having a recessed portion which forms a surface offset relative to the top surface from which extends a length of the filler tube terminating in the inlet end of the filler tube;

(g) a muffler that is in fluid communication with the engine to receive exhaust therefrom and which is oriented transverse to the lengthwise dimension of the base; and (h) a tailpipe which is in fluid communication with the muffler to receive exhaust from the muffler and which extends upward from the muffler along a substantially vertical axis, the tailpipe having an outlet port angled relative to the vertical axis and rotatable along the substantially vertical axis to direct exhaust in one of a plurality of selected directions.

* * * * *

US006472635C1

(12) EX PARTE REEXAMINATION CERTIFICATE (4910th)
United States Patent
Trinkner et al.

(10) Number: US 6,472,635 C1
(45) Certificate Issued: Feb. 17, 2004

(54) FUEL TANK FILLER ASSEMBLY FOR ENGINE DRIVEN WELDER

(75) Inventors: Michael J. Trinkner, Appleton, WI (US); Mark E. Peters, Menasha, WI (US); David E. Radtke, Appleton, WI (US)

(73) Assignee: Illinois Tool Works Inc., Glenview, IL (US)

Reexamination Request:
No. 90/006,586, Apr. 4, 2003

Reexamination Certificate for:
Patent No.: 6,472,635
Issued: Oct. 29, 2002
Appl. No.: 09/746,389
Filed: Dec. 21, 2000

( * ) Notice: This patent is subject to a terminal disclaimer.

Related U.S. Application Data

(63) Continuation of application No. 09/356,822, filed on Jul. 19, 1999, now Pat. No. 6,172,332, which is a continuation of application No. 08/853,053, filed on May 8, 1997, now Pat. No. 5,928,535.

(51) Int. Cl.⁷ ................................................. B23K 9/10

(52) U.S. Cl. ........................................ 219/133; 290/1 A
(58) Field of Search ......................... 219/133; 290/1 A, 290/1 R; 220/86.1, 86.2; 322/1; 123/3

(56) References Cited

PUBLICATIONS

Form IM–455; Ranger 10 and Ranger 10–LX Operating Manual, Lincoln Electric Company, pp. 1–7. no date available.

Form IM511–A: Ranger 9 Operator's Manual, Lincoln Electric Company, May 1995, pp. 1–5.

*Primary Examiner*—Jonathan Johnson (57) ABSTRACT

An engine driven welder has a fuel tank with a filler tube that extends upwardly from a reservoir in the machine base. The filler tube upper end and a cap thereon are below the machine top cover. The machine top cover has a cutout into which is installed a grommet that closes the cutout and that fully protects the filler tube upper end and the cap. The grommet has a hole that seals over a top portion of the filler tube such that any spilled fuel does not leak inside the machine. The filler tube has an expansion space that prevents splashback and spillover during fueling. An angled tail pipe directs engine exhaust away from the welding machine in any desired direction.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–43 is confirmed.

\* \* \* \* \*